United States Patent [19]

Hay, II et al.

[11] Patent Number: 4,940,472
[45] Date of Patent: Jul. 10, 1990

[54] CENTRIFUGAL DEVOLATILIZER

[75] Inventors: Robert A. Hay, II, Midland; Albert C. Dowell, Mt. Pleasant, both of Mich.

[73] Assignee: The Dow Chemical Company, Midland, Mich.

[21] Appl. No.: 297,371

[22] Filed: Jan. 17, 1989

[51] Int. Cl.$^5$ .............................................. B01D 19/00
[52] U.S. Cl. ........................................ 55/195; 55/203
[58] Field of Search ................ 55/191.36, 195.55, 199, 55/200, 203; 494/13, 43; 425/203

[56] References Cited

U.S. PATENT DOCUMENTS

| | | | |
|---|---|---|---|
| 1,339,211 | 5/1920 | McKerhan | 494/43 |
| 1,870,113 | 8/1932 | Hawkins et al. | 494/43 |
| 2,921,969 | 1/1960 | Loy | 494/13 |
| 4,030,897 | 6/1977 | Pelzer et al. | 494/13 |

Primary Examiner—Bernard Nozick
Attorney, Agent, or Firm—J. Robert Dean, Jr.

[57] ABSTRACT

A devolatilization apparatus is provided which removes volatiles from a variety of polymer products utilizing centrifugal forces to control the residence time of the polymer in the devolatilizer. Volatiles are efficiently removed without degrading the polymer product. The devolatilizer includes a rotatable annular chamber having an inlet, a first outlet located at a first distance from the axis of rotation of the chamber, and a second outlet located at a second distance from the axis of rotation of the chamber. Means are also provided for supplying a polymer, in liquid form, to the inlet to the annular chamber. The portion of the chamber located between the first and second outlets forms an annular pocket or subchamber. The apparatus also includes means to rotate the annular chamber at a speed sufficient to cause the liquid polymer to flow through the first and second outlets and form liquid seals at each of the outlets. A vacuum source communicating with the annular pocket is provided for removing the volatile constituents from the liquid polymer.

3 Claims, 3 Drawing Sheets

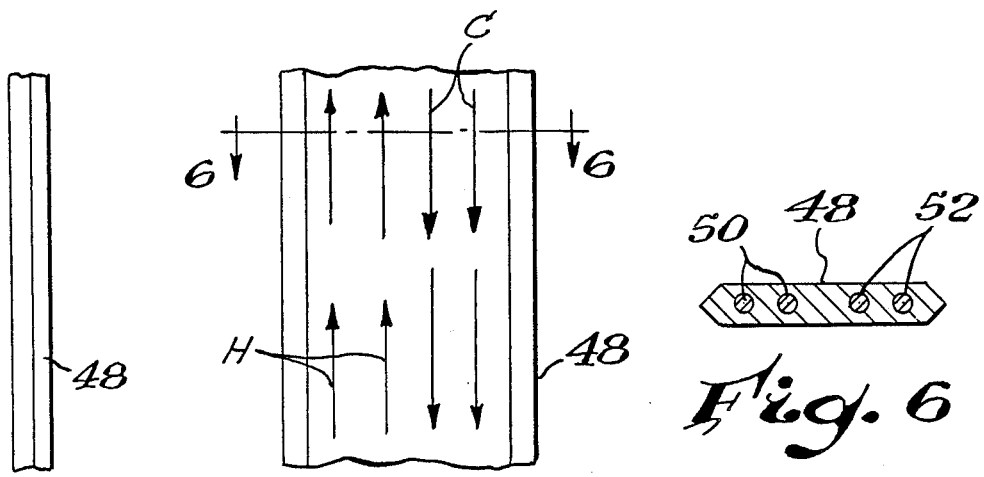
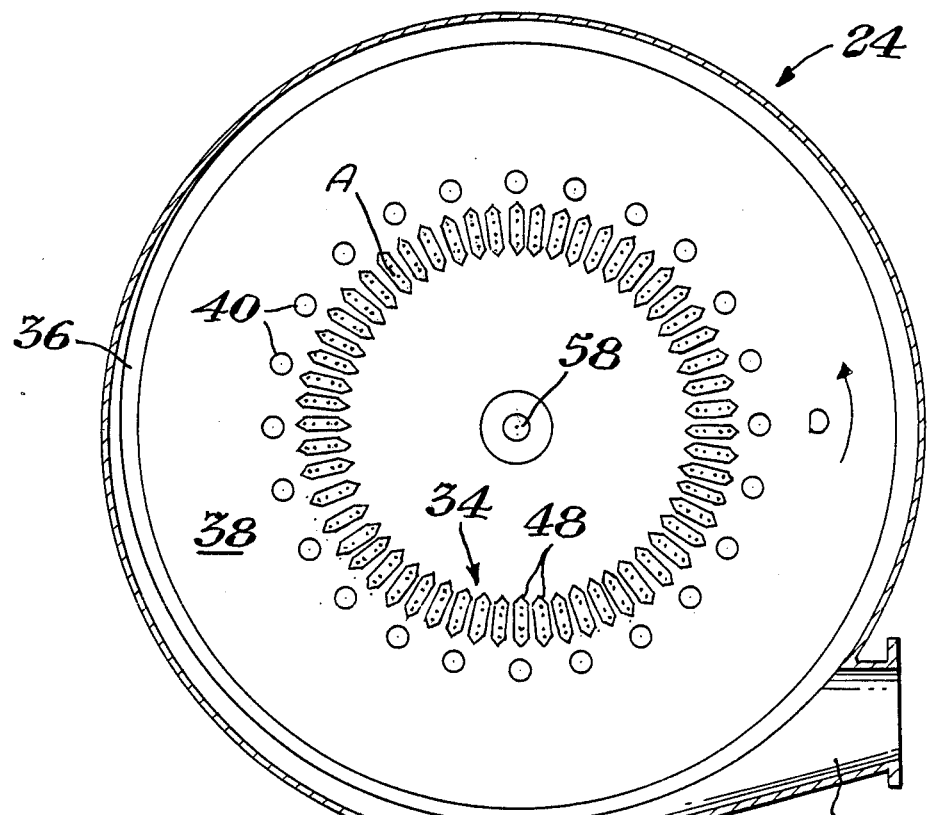

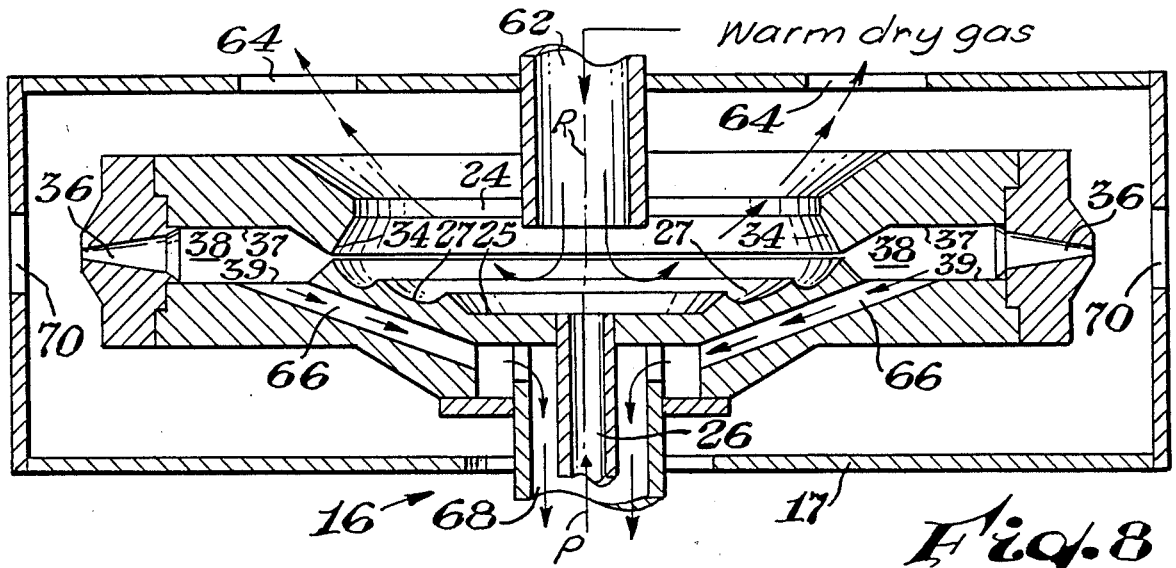
Fig. 8
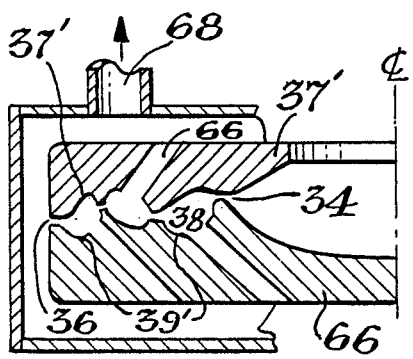
Fig. 9
Fig. 10
Fig. 11
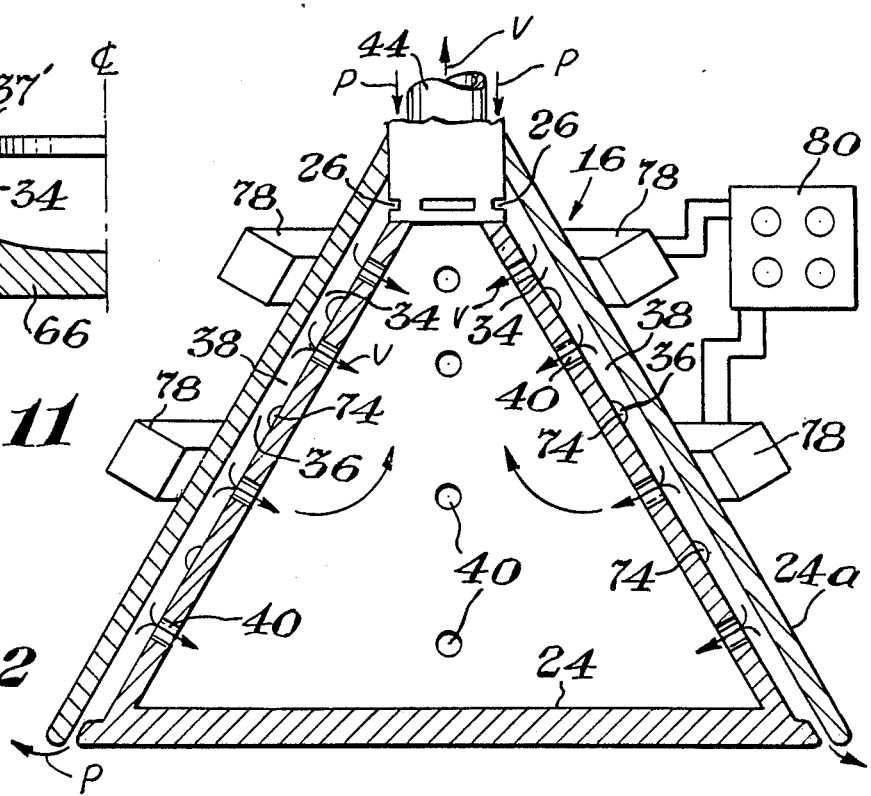
Fig. 12

CENTRIFUGAL DEVOLATILIZER

BACKGROUND OF THE INVENTION

The present invention relates to the removal of volatile constituents from the product of a polymerization process, and more particularly to an apparatus which utilizes centrifugal forces to produce reduced pressure to remove such volatile constituents from heat sensitive polymers.

Many thermoplastic polymers are prepared by the polymerization of a suitable monomer or mixture of monomers, generally in the presence of a volatile liquid media. Typically, the initial product is produced in a solution, mass, emulsion, or suspension from which it is necessary to isolate and remove unreacted monomer and solvent from the polymer product. The presence of residual monomers has many deleterious effects on a polymer. For example, they lower the strength characteristics of the polymer, produce internal bubbles in the product, may impart undesirable tastes and odors to food products that come into contact with the polymer, and reduce the polymer's resistance to degradation from environmental conditions such as heat and exposure to light. Thus, in the production of many polymers, it is necessary to remove residual unreacted monomer and/or solvent from the polymer during a finishing operation.

Such a finishing operation may involve the application of heat to the product. Heating to the vaporization temperature of the monomer or solvent results in a gradual dissipation of monomer and/or solvent over an extended period. However, long residence times increase the commercial costs of any finishing operation. While increasing the temperature of the product increases the rate of removal of volatile monomers and solvent, such higher temperatures also have an adverse effect on the properties of the polymer product and may result in the generation of further monomer as the polymer degrades. Thus, undesirably high levels of monomer may remain in the product even after extended exposure to high temperatures.

A number of apparatuses and methods have been used previously to remove small amounts of volatile materials from synthetic thermoplastic resins such as polyethylene, polystyrene, and polyvinylidene chloride. Because many of these resins are sensitive to heat, and tend to degrade upon exposure to heat, it is desirable to perform the finishing operation on the polymer in such a manner that the polymer is exposed to elevated temperatures for a minimal amount of time. Thus, conventional devolatilization procedures are often undesirable because of the length of time involved.

Conventional devolatilization systems are typically based on a gravity flow system. That is, the polymer is pressure fed through a heat exchanger into a gravity flow vacuum chamber where the volatiles are stripped from the polymer as it falls through the chamber. The polymer then continues falling under the force of gravity toward an outlet where it is removed from the vacuum chamber. In such a system, normal fluid flow control of the polymer is impossible because of the nature of the system, i.e., a reduced atmosphere with insufficient force to generate thin films for flashing off volatiles. Additionally, the polymer may become hung up on the walls of the vacuum chamber or may become otherwise trapped in stagnant or recirculating pools of product. In either case, control over the residence time of the polymer is lost, and certain portions of the polymer may be in the system for a time sufficient for polymer degradation to occur. This results in a product containing gels and carbon particles rendering it unsuitable for certain end uses.

Attempts to overcome these problems by varying the temperature in the devolatilization system have not proven successful. If lower temperatures are employed, the residence time of the polymer becomes excessively long because of the higher viscosity of the polymer at the lower temperature. Further, the rate of polymer removal from the system is slowed due to the higher product viscosity, and the rate of volatile removal is lowered because of lower vapor pressure of the volatiles.

If higher temperatures are used, undesirable degradation of the polymer occurs which is generally in proportion to the processing temperature and length of time the polymer is exposed to that temperature. Where, the polymer involved is particularly heat sensitive, exposure to higher temperatures often results in severe polymer degradation, the production of black carbon particles, and charred resin. Moreover, while the higher processing temperature speeds volatile removal initially, thermal degradation of the polymer produces additional monomer in the system. In some instances, the monomer regeneration rate is such that the overall concentration of volatiles in the polymer is increased.

Accordingly, there remains a need in this art to provide an efficient system for the removal of volatiles from polymer products which can be accomplished in a sufficiently rapid manner and which does not result in the degradation of the polymer.

SUMMARY OF THE INVENTION

The present invention meets that need by providing a devolatilization apparatus which removes volatiles from a variety of polymer products utilizing centrifugal forces to control the residence time and maintain flow control of the polymer in the devolatilizer. Volatiles are efficiently removed without degrading the polymer product.

In accordance with one aspect of the present invention, an apparatus for the removal of volatile constituents from the product of a polymerization process is provided which includes a rotatable annular chamber having an inlet, a first outlet located at a first distance from the axis of rotation of the chamber, and a second outlet located at a second distance from the axis of rotation of the chamber. Means are also provided for supplying the polymer, in liquid form, to the inlet to the annular chamber. The portion of the chamber located between the first and second outlets forms an annular pocket or subchamber. The apparatus also includes means to rotate the annular chamber at a speed sufficient to cause the liquid polymer to flow through the first and second outlets and form liquid seals at each of the outlets. A vacuum source communicating with the annular pocket between the liquid seals is provided for removing the volatile constituents from the liquid polymer.

In a preferred embodiment of the invention, the apparatus also includes at least one wall which forms a portion of the annular pocket, with the wall being normal to the axis of rotation of the chamber. The liquid polymer flows over the wall and forms a thin film which enhances separation of any volatiles therefrom. The wall may also have a stepped or scalloped surface over which the liquid polymer flows to increase both the mixing of the liquid polymer as well as the residence time of the polymer in the annular pocket. The wall of the annular pocket over which the liquid polymers flows may also be positioned at an acute angle from the axis of rotation of the chamber to further increase the residence time of the polymer melt in the annular pocket. This permits sufficient time for all volatiles to be separated from the polymer.

The apparatus of the present invention may also include means intermediate to the first and second outlets in the annular pocket for forming at least one additional liquid seal as the liquid polymer flows from the first to the second outlet. In one embodiment, the means for forming the at least one additional liquid seal comprises a flow restricting barrier positioned adjacent the wall forming a portion of the annular pocket. As the liquid polymer flows along the wall of the annular pocket, the flow restricting barrier or barriers hold up the polymer flow and form melt pools along the length of the wall. Again, separation of volatiles is enhanced.

In another embodiment of the invention, opposing walls in the annular pocket are provided which form at least one additional restriction to polymer flow and form an additional liquid seal in the annular pocket. The opposing walls are designed to have stepped surfaces over which the liquid polymer flows. In a preferred form, the walls are arranged so that the liquid polymer is caused to flow against alternating opposing wall sections to enhance volatile separation from the polymer.

In another embodiment of the present invention, the annular chamber in the devolatilizer includes a first wall over which the liquid polymer flows between the inlet and the first outlet. Preferably, that first wall has a stepped or scalloped surface. The apparatus further includes means for flowing a gas over the liquid polymer as it flows over that wall between the inlet and the first outlet. Again, the flow of a warm, dry gas enhances mass transfer and separation of the volatiles from the liquid polymer.

In yet another embodiment of the invention, the first outlet to the annular chamber comprises a multiplicity of closely spaced apart barriers restricting the flow of the liquid polymer through the outlet and forming a multiplicity of liquid seals about the outer periphery of a first portion of the annular chamber. In a preferred form, the barriers comprise flat plate fins which include passageways therein for conducting heat transfer media therethrough.

Further, in another embodiment of the invention, apparatus for the removal of volatile constituents from the product of a polymerization process is provided which includes means for heating the polymerization product to maintain a liquid polymer and a stationary housing supporting a rotatable annular chamber, the annular chamber having an inlet for the liquid polymer and an outlet. At least one barrier is positioned between the inlet and the outlet restricting the flow of liquid polymer and forming annular pockets between the inlet and at least one barrier and outlet and at least one barrier, respectively. The apparatus further includes means to rotate the annular chamber at a speed sufficient to cause the liquid polymer to flow through the inlet and form a liquid seal at the at least one barrier. Finally, a vacuum source communicating with the annular pockets is provided for removing volatile constituents from the liquid polymer.

In a preferred form, the apparatus includes means to heat the housing. The walls forming the annular chamber may be at an acute angle from the axis of rotation of the chamber to increase the residence time of the polymer in the apparatus, and in a preferred form, the walls of the annular chamber form a cone. The at least one barrier extends circumferentially about the exterior surface of the walls of the chamber and may include a plurality of spaced apart barriers along the length of the annular chamber. Each of the spaced apart barriers would restrict the flow of the liquid polymer and form separate liquid seals.

The use of centrifugal forces to drive the liquid polymer through the devolatilization apparatus maintains flow control over the polymer. This permits control of the residence time of the polymer in the apparatus and avoids the prior art problems of inadequate processing time for volatile separation or excess processing time resulting in degraded polymer and carbon or gel formation. The use of barriers to form flow restrictions and liquid seals within the apparatus provides a self-regulating system in which liquid polymer accumulates at each liquid seal only until the mass of the polymer collected is sufficient to cause the centrifugal forces generated to drive the polymer through the restriction. As will be apparent to those skilled in the art, the centrifugal forces generated by the apparatus, and the flow restricting barriers therein, may be optimized for specific polymers, melting temperatures, and polymer viscosities.

Accordingly, it is an object of the present invention to provide an apparatus for the efficient removal and separation of volatile constituents from polymer products which may be accomplished in a rapid manner and which does not result in the degradation of the product. This, and other objects and advantages of the present invention, will become apparent from the following detailed description, the accompanying drawings, and the appended claims.

BRIEF DESCRIPTION OF THE DRAWINGS

FIG. 4 is an edge view of a flat plate heat transfer fin utilized in the apparatus of FIG. 3;

FIG. 5 is a side view of a flat plate heat transfer fin utilized in the apparatus of FIG. 3;

FIG. 6 is a sectional view taken along line 6—6 in FIG. 5:

FIG. 7 is a view, in section, taken along line 7—7 in FIG. 3;

FIG. 8 is a side view, in section, of another embodiment of the devolatilizer of the present invention;

FIG. 9 is a sectional view of an alternative configuration for the annular pocket portion of the devolatilizer of FIG. 8;

FIG. 10 is a sectional view of yet another alternative configuration for the annular pocket portion of the devolatilizer of FIG. 8;

FIG. 11 is a sectional view of yet another alternative configuration for the annular pocket portion of the devolatilizer of the FIG. 8 and FIG. 12 is a side view, in section, of another embodiment of the devolatilizer of the present invention.

DESCRIPTION OF THE PREFERRED EMBODIMENTS

Figure 1:
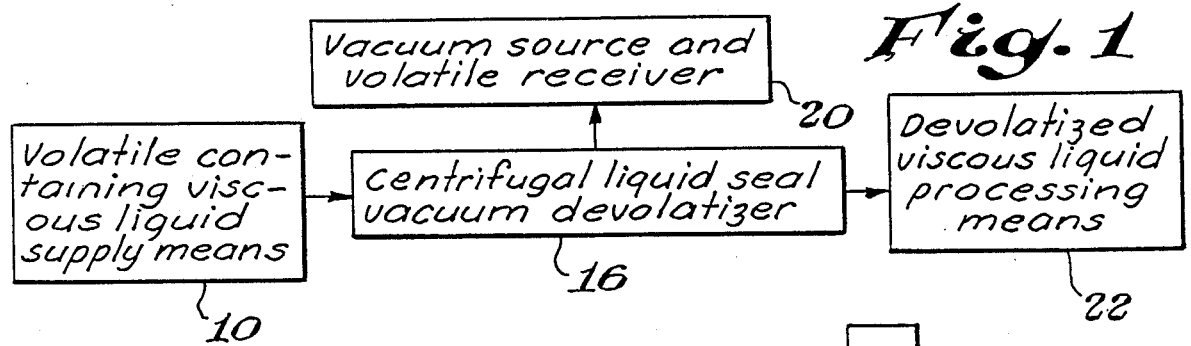
FIG. 1 is a schematic illustration of a devolatilization process using the apparatus of the present invention.

The devolatilizer apparatus of the present invention is useful in removing volatile constituents from products in flowable form including concentrated solutions of polymer produced by solution or mass polymerization techniques. The apparatus may also find use in removing volatile constituents from flowable emulsions. Alternatively, the volatiles-containing product may be in the form of beads such as may be obtained directly from a suspension polymerization reaction or in the form of a dried coagulant obtained when a latex is coagulated. In these instances, a heated extruder would typically be used to supply the product in flowable liquid form to the devolatilizer.

The term "volatile-containing product" as used herein designates polymeric resinous materials in intimate mixtures such as true solutions, dispersions, and/or emulsions. Typically, the volatile constituents will be in liquid or gaseous form. Also, the polymeric resinous materials will generally form the continuous phase while the volatile constituents will form the discontinuous phase.

The apparatus of the present invention finds particular use in devolatilizing thermally sensitive resinous materials such as relatively rigid polymers of monovinylidene aromatic resins including styrene and resinous copolymers thereof with acrylonitrile, methylacrylate, maleic anhydride, maleimide, copolymers of alpha methyl styrene and acrylonitrile, polyolefins such as polyethylene and polypropylene, polycarbonates, vinylidene chloride copolymers, polyphenylene oxides, and resinous copolymers and blends thereof.

Such volatile-containing products may also have graftable rubber substrates dispersed therein to improve the impact resistance of those resins which are relatively rigid. The apparatus of the present invention is also effective in removing volatile constituents from resins containing graftable rubber substrates. Suitable rubbery substrate polymers include, but are not limited to, any polymer or copolymer having a glass transition temperature ($T_g$) of less than about 0° C., and preferably not higher than −20° C., as determined by the American Society of Testing and Materials (ASTM) test method D 746-52T.

Graftable rubber substrates may be formed from various elastomeric materials such as diene rubbers, acrylate rubbers, ethylene-propylene rubbers, hydrogenated diene rubbers, and EPDM rubbers and mixtures thereof. A diene rubber is any rubbery polymer of one or more conjugated 1,3-diene such as butadiene, isoprene, piperylene, chloroprene, and the like. An acrylate rubber is any rubbery polymer of one or more acrylate monomers such as 2-ethylhexyl acrylate, butyl acrylate, or the like. An EPDM rubber is an interpolymer formed from ethylene, propylene, and one or more dienes. Techniques for the dispersal of such graftable rubber substrates are well known in the art.

Any material which can be volatilized may be removed from intimate mixture with a polymer resin through the use of the devolatilizer of the present invention. Examples of volatile constituents which may be removed include, in gaseous or liquid form, solvents such as ethylbenzene, methyl ethylketone, water, tetrachloroethylene, pentane, hexane, cyclohexane, octane benzene, carbon tetrachloride, tetrahydrofuran, and acetone, as well as unreacted monomers such as ethylene, vinyl chloride, vinylidene chloride, and the like. The chemical nature of the particular solvent or monomer is not material to the present invention except that it will be apparent to those skilled in the art that the materials of construction of the devolatilizer should be resistant to the volatile constituents which the apparatus will encounter.

Usually the volatile constituents to be removed will constitute the liquid medium in which the polymeric product was obtained, prepared, or purified. The liquid medium may also contain unreacted monomers. Thus, solutions of polymeric product prepared by bulk polymerization techniques may be treated by the devolatilizer of the present invention. Another source of volatile materials may be liquid solvents added to the product to provide a stripping action. Such stripping agents such as water, carbon dioxide, or an alcohol may also be removed using the devolatilizer.

The concentration of solids in the product solution, dispersion, or emulsion which is suitable for use in the present invention may vary depending upon the nature of the polymeric resin and the physical properties, such as viscosity, of the solution. The solids concentration should preferably be high to minimize processing costs. However, too concentrated a solution or dispersion may be difficult to pump satisfactorily. It will be understood by those skilled in the art that the viscosity of such concentrated solutions may be reduced by the addition of further solvent and suitable mixing prior to treatment in the devolatilizer. Generally, suitable solids concentrations for polymer solutions will be in the range of from about 10 to about 99.5% by weight of the total weight of the solution. The polymer product may also contain other nonvolatile components or additives which will not interfere with or be removed by the devolatilizer. Examples of such components are plasticizers, antioxidants, and mineral fillers.

Figure 2:
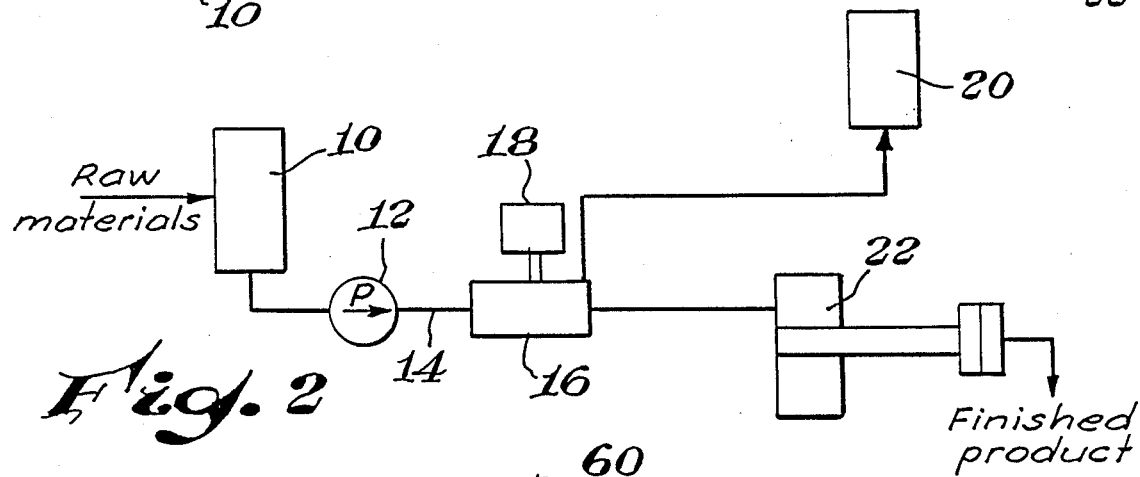
FIG. 2 is another schematic illustration showing in greater detail the devolatilization process using the apparatus of the present invention.

Referring now to FIGS. 1 and 2, the overall polymerization process and apparatus are schematically illustrated including the positioning of the devolatilizer. As shown, raw materials, including monomers and volatile solvents are sent to a polymerization reactor or chamber 10 where the polymerization reaction occurs. Alternately, chamber 10 may be a solution tank where a mixture or blend of polymers is produced, or where various additives such as pigments, fillers, or reinforcing agents are blended with a polymer solution. The polymer product containing one or more volatile constituents is then sent by pump 12 through conduit 14 to devolatilizer 16. Exemplary pumps which are suitable for use in the invention include gear pumps, i.e., pumps having a variety of intermeshing gear designs, and screw pumps, i.e., single, double, intermeshing, or nonintermeshing designs.

Devolatilizer 16 includes means to heat the polymer product (not shown in FIGS. 1 and 2). Alternatively, or in conjunction with that heating means, the product may be preheated prior to entry into devolatilizer 16 using any conventional heating means such as by steam pipes, a heated extruder, or by an electric heater. Devolatilizer 16 also includes a suitable drive means 18 and a source of vacuum 20 which removes and receives the volatile constituents from the polymer product. After the polymer product leaves devolatilizer 16, it may be further processed as desired such as by an extruder 22 or the like to produce a finished, devolatilized product. Devolatilizer 16 may be operated in either a continuous or batch mode, and it will be apparent that when operated in a continuous mode there must be a sufficient supply of liquid polymer provided.

Figure 3:
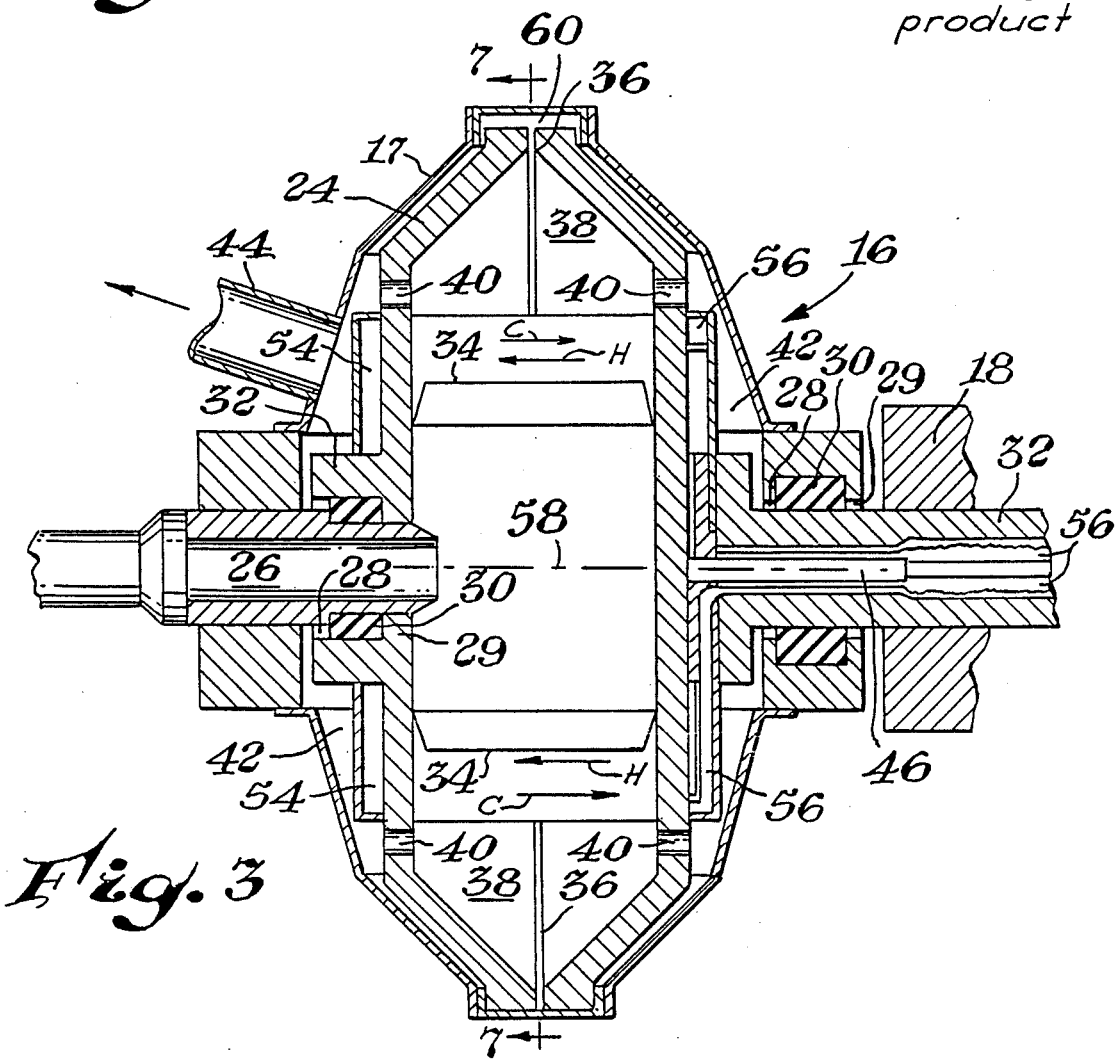
FIG. 3 is a side view, in section, of one embodiment of the devolatilizer of the present invention.

Referring now to FIGS. 3-7, in which one embodiment of the devolatilizer of the present invention is illustrated in greater detail, there is provided a centrifugal devolatilizer 16 including an outer housing 17 and having a rotatable annular chamber 24 with inlet 26 for the volatile-containing liquid polymer product. As shown in FIG. 3, inlet 26 is located substantially along the axis of rotation of annular chamber 24. Rotatable chamber 24 is fixedly attached to, and revolves around, inlet 26 by means of fluid-tight rotary seals 28, 29 and bearings 30. Chamber 24 is driven by suitable drive means 18 (partially shown in FIG. 3) such as a motor which causes drive shaft 32, secured to chamber 24, to rotate. As shown, drive shaft 32 is centrally mounted along the axis of rotation of chamber 24. Although chamber 24 may be of any configuration, it will preferably be symmetrical to provide for a smooth, balanced rotation. Other chamber configurations are illustrated and explained in greater detail below.

Chamber 24 also contains a first outlet 34 for liquid polymer product located a first distance from the axis of rotation of the chamber as well as a second outlet 36 located at a second distance from the axis of rotation of the chamber. Between outlets 34 and 36 there is formed an annular pocket or subchamber 38 where the volatile constituents contained in the polymer are removed. A vacuum source (not shown in FIGS. 3-7) communicates with annular pocket 38 through a plurality of vent ports 40 located in a wall of chamber 24. Removed volatiles are carried from annular pocket 38 through vent ports 40 and collected in manifold 42 formed in outer housing 17 of devolatilizer 16. An outlet 44, communicating with the vacuum source, collects the volatiles and removes them from the devolatilizer.

Flow restrictions are provided at each of outlets 34 and 36 so that the liquid polymer product accumulates at each outlet to form a liquid seal at each end of annular pocket 38. This permits control of the vacuum in pocket 38. Additionally, the rotational speed of the chamber 24 and the flow restrictions at each of the outlets makes the flow of product through the devolatilizer self-regulating. That is, liquid polymer will tend to accumulate at first outlet 34 until the mass of the polymer, and the centrifugal forces resulting from the rotation of the chamber, together urge liquid through the outlet. This provides a controlled flow of product into the annular pocket 38 for volatile removal. Thus, the residence time of the polymer product in rotatable chamber 24 is dependent upon the configuration of the chamber and its rotational speed, the viscosity of the polymer and solvent employed, the polymer concentration in the solvent, the molecular weight of the polymer, and the temperature to which the polymer is heated.

For a given residence time, the residual monomer level will decrease as the solution temperature is raised because the increased vapor pressure and decreased viscosity will enhance the removal rate of volatile monomer. However, care must be taken in controlling the temperature because further increases in temperature may lead to degradation of the polymer. Further, the residence time of the polymer in the pocket is closely controlled by the action of the two liquid seals at the opposite ends of the pocket. This prevents excessive exposure of heat sensitive product to treatment and reduces polymer degradation while optimizing volatile removal.

Through the use of centrifugal forces, the devolatilizer of the present invention may be operated so that all of the polymer product, on the average, experiences a lesser residence time than with previously utilized gravity fed systems. That is, the gravitational forces generated will act directly on each molecule of product as it moves through the system as opposed to pressure flow forces which do not. By decreasing the average residence time of devolatilization for all polymer material, higher devolatilization temperatures may be employed without significant polymer degradation and monomer regeneration. The temperatures utilized for devolatilization in the apparatus of the present invention are in the range of from about 180° to about 300° C., and preferably from about 220° to about 260° C. Typical residence times for all polymer material in the devolatilizer range from about 0.1 to about 10 minutes, and preferably from about 0.3 to about 3 minutes.

Centrifugation at an angular velocity which produces a centrifugal gravity on the order of about 50 to 2000 times the normal gravitational pull has been found to separate gaseous and liquid volatile components in a discontinuous phase from the continuous phase of liquid polymer product. By spreading the polymer into a thin film over the surfaces of the rotatable chamber, a greater surface area of the polymer is exposed, which enhances the removal of volatile constituents.

To enhance the removal of the volatile constituents from the liquid polymer product, the liquid polymer is exposed to a controlled source of heat in the annular pocket 38. In the embodiment of the invention illustrated in FIGS. 3-7, the controlled heat source is from hot heat transfer media supplied to chamber 24 through conduit 46. To contact the liquid polymer product, first outlet 34 to chamber 24 comprises a multiplicity of closely spaced apart barriers 48 which form a multiplicity of fluid flow passages. As best seen in FIGS. 4-7. barriers 48 are in the form of flat plate fins which include passageways 50, 52 therein for conducting the heat transfer media therethrough. For the sake of simplicity, only a few of the barriers 48 have been drawn in FIG. 7. However, it will be understood that the barriers are spaced about the entire annular area indicated by A.

Hot heat transfer media is supplied through conduit 46 into passageways 50 of heat transfer fins or barriers 48 and flows in the direction indicated by arrows H in FIG. 5. Referring now to FIG. 3, the hot heat transfer media flows across first outlet 34 in the direction indicated by arrows H and is collected in manifold 54. The initially hot media is directed to flow so that it initially contacts the liquid polymer product as it passes through first outlet 34. The cooler heat transfer media which is collected in manifold 54 is then sent back across outlet 34 in the direction of arrows C where it gives up any remaining heat to the liquid polymer product. The heat transfer media is then removed from chamber 24 through collecting conduit 56 where it may be reheated and recycled.

The progression of liquid polymer product through the devolatilizer may be seen by reference to FIG. 7. Liquid polymer enters chamber 24 near the center axis of rotation generally indicated at 58. Because of the centrifugal forces generated by the rotation of chamber 24 in the direction of arrow D, the polymer flows outwardly to first outlet 34 where a first liquid seal is formed. As polymer flows through outlet 34 and around fins 48, it is heated by the heat transfer media. This causes volatiles to be released and removed by the vacuum in annular pocket 38. As shown, a multiplicity of vent ports 40 collect and remove the volatile constituents from the polymer in pocket 38. The devolatized polymer again collects to form a liquid seal near second outlet 36. The centrifugal forces and the mass of polymer building up at the second outlet forces the liquid polymer through outlet 36, which may be in the form of a flow restriction such as an extrusion die opening.

Once through second outlet 36, the devolatilized product is then sent through conduit 60 out of chamber 24 to be further processed as required or formed directly into an end product. Exemplary further processing steps may include allowing strands of the devolatilized product to extrude through outlet 36 where the strands are cut with a stationary knife. The cut polymer, in the form of pellets, may then be cooled by impingement with a water spray. The pellets may then be dried.

Referring now to FIG. 8, where like reference numerals will refer to like structural elements, another embodiment of the invention is shown. As can be seen, devolatilizer 16 includes an outer housing 17 and an inner rotatable chamber 24 which rotates about an axis of rotation R. Liquid polymer product enters chamber 24 through inlet 26 in the direction of arrow p. The centrifugal forces resulting from the rotation of chamber 24 causes the liquid polymer product to form a thin film along an inner wall 25 of chamber 24. Inner wall 25 may have a scalloped configuration 27 to increase the residence time of the polymer in the chamber and to improve mass transfer of volatile constituents by exposing additional surface area of the polymer.

A source of warm, dry gas is supplied through inlet 62 in stationary housing 17. The warm gas flows in the direction indicated by the arrows and contacts the thin film of liquid polymer to heat it and initiate removal of the volatiles. After contacting the polymer, the gas is removed through outlets 64 in housing 17 where it may be reheated and recycled after any volatiles are separated.

The polymer flows, under the influence of the rotational forces in chamber 24, to first outlet 34 where it collects to form a first liquid seal. Again, the speed of rotation of the chamber, the size of the opening in outlet 34, and the viscosity and mass of the polymer can all be used to optimize mass transfer of volatiles from the polymer while controlling the residence time of the polymer so that it is not exposed to excessive heat during processing. Polymer flowing through first outlet 34 passes into annular pocket 38 where it tends to flow down one or both of walls 37 and 39, which are shown to be generally normal to the axis of rotation of chamber 24. It will be apparent that walls 37 and 39 can be configured in an acute angle from the axis of rotation of the chamber. A source of vacuum, not shown acts to remove the volatiles from the polymer product in annular pocket 38 through conduits 66 and 68 in the direction shown by the arrows.

Liquid polymer also collects at second outlet 36 at the flow restriction there to form the second liquid seal which permits a vacuum to be applied to the product in annular pocket 38. Once the liquid polymer exits second outlet 36, it may be collected and removed from devolatilizer 16 through outlets 70. From there, it may be further processed as desired or formed directly into an end product.

To enhance mass transfer and removal of volatile constituents from the polymer, the walls 37 and 39 of annular pocket 38 may assume a number of configurations. For example, in the embodiment of the invention shown in FIG. 9, wall 37 may have a stepped or scalloped configuration. This configuration results in a cascading action of the liquid polymer as it flows from step to step along the wall. The mixing generated by the stepped surface exposes additional polymer surface to the vacuum in the pocket. Additionally, the residence time in pocket 38 may be increased somewhat by the wall configuration to complete volatiles removal.

In the embodiment of the invention illustrated in FIG. 10, one or more flow restricting barriers 72 may be positioned within annular pocket 38. As the liquid polymer flows along wall 37, these barriers 72 hold up the flow of polymer and form additional melt pools and liquid seals. Again, the residence time of the polymer in annular pocket is increased to improve volatiles removal.

In the embodiment of the invention illustrated in FIG. 11, opposing wall portions 37' and 39' are provided which form additional flow restrictions within annular pocket 38. These opposing wall portions cause the formation of additional liquid seals within pocket 38 and enhance mass transfer of the volatiles from the polymer. In the preferred form shown, the walls are arranged so that the liquid polymer is caused to flow against alternating opposing wall portions to improve mixing of the polymer and expose additional surface of the polymer to the vacuum applied in pocket 38.

Yet another embodiment of the invention is illustrated in FIG. 12. In this embodiment of the invention, the devolatilizer 16 includes a conically-shaped rotatable chamber 24 having an inlet for a liquid polymer product. One or more annular pockets 38 are formed along the length of chamber 24 by barriers or projections 74. Projections 74 extend about the periphery of chamber 24 and form flow restrictions between the wall of chamber 24 and that of inner housing 24a. Chamber 24 is rotated by suitable means (not shown) at a speed sufficient to cause the liquid polymer to flow as a thin film from inlet 26 along the length of the chamber in the direction indicated by arrows P.

When the polymer encounters a projection 74, the flow restriction causes a liquid seal to form having a first outlet 34 and a second outlet 36. Between the two outlets, an annular pocket 38 is subjected to vacuum through vent ports 40. As shown, a multiplicity of annular pockets 38 may be formed along the length of the chamber. Volatile-containing substituents in the polymer product are removed by the vacuum and exit devolatilizer 16 through outlet 44 in the direction indicated by arrows V. Heaters 78, which are controlled through controller 80, provide a regulated amount of heat to the polymer product to aid in volatile removal.

While certain representative embodiments and details have been shown for purposes of illustrating the invention, it will be apparent to those skilled in the art that various changes in the methods and apparatus scope of the invention, which is defined in the appended claims.

What is claimed is:

1. Apparatus for the removal of volatile constituents from the product of a polymerization process comprising:
    (a) a stationary housing supporting a rotatable annular chamber, said annular chamber having an inlet located substantially along the axis of rotation of said annular chamber, a multiplicity of closely spaced apart barriers forming a multiplicity of fluid flow passages located at a first distance from the axis of rotation of said chamber, and an outlet located at a second distance from the axis of rotation of said chamber, the portion of said chamber located between said passages and said outlet forming an annular pocket;

(b) means for providing a liquid polymer to said inlet;

(c) means to rotate said annular chamber at a speed sufficient to cause said liquid polymer to flow through said passages and said outlet and form liquid seals at each of said passages and said outlet; and (d) a vacuum source communicating with said annular pocket for removing volatile constituents from said liquid polymer.

2. The apparatus of claim 1 in which said barriers comprise flat plate fins.

3. The apparatus of claim 2 in which said flat plate fins include passageways therein for conducting heat transfer media therethrough.

* * * * *

UNITED STATES PATENT AND TRADEMARK OFFICE
CERTIFICATE OF CORRECTION

PATENT NO. : 4,940,472

DATED : Jul. 10, 1990

INVENTOR(S) : Robert A. Hay, II; and Albert C. Dowell

It is certified that error appears in the above-identified patent and that said Letters Patent is hereby corrected as shown below:

Column 10, line 57 , "methods and apparatus scope of" should read --methods and apparatus disclosed herein may be made without departing from the scope of- -.

Signed and Sealed this

Tenth Day of March, 1992

Attest:

HARRY F. MANBECK, JR.

*Attesting Officer*  *Commissioner of Patents and Trademarks*